UNITED STATES PATENT OFFICE.

JACOB SCHAUB, OF NEWARK, NEW JERSEY, ASSIGNOR TO AMERICAN LINSEED COMPANY, A CORPORATION OF NEW JERSEY.

ARTIFICIAL FUEL AND METHOD OF MAKING SAME.

1,262,268.   Specification of Letters Patent.   Patented Apr. 9, 1918.

No Drawing.   Application filed October 4, 1917. Serial No. 194,711.

*To all whom it may concern:*

Be it known that I, JACOB SCHAUB, a citizen of the United States, and a resident of Newark, in the county of Essex and State of New Jersey, have invented certain new and useful Improvements in Artificial Fuel and Methods of Making Same, of which the following is a specification.

The objects of my invention are to produce an artificial fuel which may be easily ignited, is rich in heat units, produces a high heat, does not fuse while burning, and leaves a minimum of residue or ash when consumed.

With these objects in view I place approximately forty-six parts of commercial methyl alcohol in a suitable vessel, and add approximately four parts of cellulose having a content of nitrogen which renders it soluble therein, preferably cellulose-pentanitrate, and agitate until the cellulose-pentanitrate has been dissolved. This colloid may then be solidified by the addition of water. If the agitation is continued while the water is added it will quickly solidfy into a firm solid jelly. The solution will also solidfy if poured into water or immersed in water. The resultant product does not fuse while burning, is rich in heat units, produces a high heat, leaves a minimum of ash or residue when consumed and its flame is readily extinguished.

I claim:

1. An artificial fuel consisting of cellulose having a nitrogen content which renders it soluble in methyl alcohol, methyl alcohol and water.

2. An artificial fuel consisting of cellulose pentanitrate, methyl alcohol and water.

3. The process of producing artificial fuel which consists of dissolving in methyl alcohol cellulose having a nitrogen content which renders it soluble therein and solidfying the colloid so formed with water.

4. The process of producing artificial fuel which consists of dissolving cellulose pentanitrate in methyl alcohol and solidfying the colloid so formed with water.

Signed at New York city, in the county of New York and State of New York, this second day of October, 1917.

JACOB SCHAUB.

Witnesses:
MARGARET A. HECK,
PAUL R. JAMES.